(12) United States Patent
Ando

(10) Patent No.: US 10,417,951 B2
(45) Date of Patent: Sep. 17, 2019

(54) IMAGE PROCESSING APPARATUS

(71) Applicant: MegaChips Corporation, Osaka (JP)

(72) Inventor: Jun Ando, Chiba (JP)

(73) Assignee: MegaChips Corporation, Osaka (JP)

( * ) Notice: Subject to any disclaimer, the term of this patent is extended or adjusted under 35 U.S.C. 154(b) by 272 days.

(21) Appl. No.: 15/472,640

(22) Filed: Mar. 29, 2017

(65) Prior Publication Data

US 2017/0287378 A1    Oct. 5, 2017

(30) Foreign Application Priority Data

Mar. 31, 2016    (JP) .................................. 2016-070496

(51) Int. Cl.
*G09G 3/20*        (2006.01)
*H04N 19/124*      (2014.01)
(Continued)

(52) U.S. Cl.
CPC ......... *G09G 3/2048* (2013.01); *G09G 3/2003* (2013.01); *G09G 3/36* (2013.01); *H04N 19/124* (2014.11); *H04N 19/136* (2014.11); *H04N 19/154* (2014.11); *H04N 19/176* (2014.11); *H04N 19/182* (2014.11);
(Continued)

(58) Field of Classification Search
CPC ...... G09G 3/2048; G09G 3/2003; G09G 3/36; G09G 10/0286; G09G 2310/061; G09G 2310/08; G09G 2340/02; G09G 2360/12; G09G 2340/06; H04N 19/154; H04N 19/176; H04N 19/182; H04N 19/186; H04N 19/503; H04N 19/91; H04N 19/124; H04N 19/136
See application file for complete search history.

(56) References Cited

U.S. PATENT DOCUMENTS 4,631,521 A      12/1986  El-Sherbini
5,287,420 A *    2/1994   Barrett ................. H04N 19/186
                                              375/240.01
(Continued)

FOREIGN PATENT DOCUMENTS

JP    S61-161871 A    7/1986
JP    H5-219384 A     8/1993
(Continued)

*Primary Examiner* — Menatoallah Youssef
(74) *Attorney, Agent, or Firm* — Osha Liang LLP

(57) ABSTRACT

In an image processing apparatus, a first random number seed generation circuit generates a first random number seed corresponding to the line number. An image compression circuit generates compressed data by quantizing addition data acquired by adding up of first image data and a first pseudo random number generated based on the first random number seed and a quantization coefficient. A second random number seed generation circuit generates a second random number seed that corresponds to the line number and is equal to the first random number seed. An image decompression circuit generates decompressed data by dequantizing the compressed data using a quantization coefficient, and generates second image data by subtracting a second pseudo random number equal to the first pseudo random number, which is generated based on the second random number seed and the quantization coefficient, from the decompressed data.

17 Claims, 13 Drawing Sheets

(51) Int. Cl.
*H04N 19/136* (2014.01)
*H04N 19/154* (2014.01)
*H04N 19/176* (2014.01)
*H04N 19/182* (2014.01)
*H04N 19/186* (2014.01)
*H04N 19/503* (2014.01)
*H04N 19/91* (2014.01)
*G09G 3/36* (2006.01)

(52) U.S. Cl.
CPC ......... *H04N 19/186* (2014.11); *H04N 19/503* (2014.11); *H04N 19/91* (2014.11); *G09G 2310/0286* (2013.01); *G09G 2310/061* (2013.01); *G09G 2310/08* (2013.01); *G09G 2340/02* (2013.01); *G09G 2340/06* (2013.01); *G09G 2360/12* (2013.01)

(56) References Cited

U.S. PATENT DOCUMENTS

| | | | |
|---|---|---|---|
| 5,553,164 A | 9/1996 | Itagaki | |
| 2004/0047489 A1* | 3/2004 | Seo | G06T 1/0028 382/100 |
| 2005/0185819 A1* | 8/2005 | Delp | G06T 1/0028 382/100 |
| 2009/0262928 A1* | 10/2009 | Busari | G06F 7/588 380/46 |
| 2013/0251285 A1 | 9/2013 | Kurokawa et al. | |

FOREIGN PATENT DOCUMENTS

| | | |
|---|---|---|
| JP | 2003-44847 A | 2/2003 |
| JP | 2006-50299 A | 2/2006 |
| JP | 2013-195784 A | 9/2013 |

* cited by examiner

IMAGE PROCESSING APPARATUS

CROSS REFERENCE TO RELATED APPLICATION

The present application claims priority under 35 U.S.C. § 119 to Japanese Patent Application No. 2016-070496 filed on Mar. 31, 2016, which is hereby expressly incorporated by reference, in its entirety, into the present application.

BACKGROUND OF THE INVENTION

The present invention relates to an image processing apparatus that stores image data, which is compressed by quantization based on random number dithering, in an image memory and decompresses the image data stored in the image memory by dequantization.

As an image communications standard used in a device having a liquid crystal display apparatus, such as a tablet personal computer (PC) and a notebook PC, there is the Embedded DisplayPort Standard.

The Embedded DisplayPort Standard includes a function, called Panel Self Refresh (PSR) as a technology for reducing the power consumption of the device. In the case of displaying an image using the function of PSR, a transmission side circuit stops the transmission of image data after the function of PSR performs switching from the display of a moving image in the case of normal operation to the display of a still image, and a reception side circuit included in an image processing apparatus of a liquid crystal display apparatus displays an image corresponding to image data stored in an image memory in the case of normal operation.

FIG. 9 is a block diagram of an example showing the configuration of an image processing apparatus of a liquid crystal display apparatus. An image processing apparatus 90 shown in FIG. 9 includes a receiving circuit 92, an image compression circuit 94, an image decompression circuit 96, an output image selection circuit 98, and a display control circuit 100.

In the case of normal operation, image data transmitted from a transmission side circuit 102 is received by the receiving circuit 92, and is output from the output image selection circuit 98. Under the control of the display control circuit 100, an image corresponding to the image data output from the output image selection circuit 98 is displayed on an image display apparatus 104.

In contrast, in the case of displaying an image using the function of PSR, the image data received by the receiving circuit 92 in the case of normal operation is compressed by the image compression circuit 94, and is stored in an image memory 106. Image data read from the image memory 106 according to the image display timing is decompressed by the image decompression circuit 96, and the decompressed image data is output from the output image selection circuit 98. Then, under the control of the display control circuit 100, an image corresponding to the image data output from the output image selection circuit 98 is displayed on the image display apparatus 104.

In the case of displaying an image using the function of PSR, it is possible to reduce the bandwidth and the capacity of the image memory 106 by applying compression processing on the image data stored in the image memory 106, as described above. However, when switching from the display of a moving image to the display of a still image, the displayed image is switched from a non-compressed image to a compressed image, and for this reason, perceivable degradation of image quality occurs due to compression processing, which is unfavorable.

In addition, the Embedded DisplayPort Standard includes a function called Panel Self Refresh 2 (PSR2) in which the transmission side circuit re-transmits image data of only a rectangular region, which is to be updated, in the entire image to perform Selective Update. In order to respond to the function of PSR2, as compression and decompression processing, it is required to independently encode and decode image data only in a part of the image, for example, by the line or by the block.

In image compression, conversion from the RGB color space to the YUV color space or the like is generally performed for the purpose of improving compression efficiency by reducing correlation between pieces of image data.

FIG. 10A is a block diagram of an example showing the configuration of the image compression circuit shown in FIG. 9. The image compression circuit 94 shown in FIG. 10A includes a color space conversion circuit 108 and first, second, and third encoding circuits 110, 112, and 114 as encoding circuits.

In the image compression circuit, the color space conversion circuit 108 converts image data of the RGB color space into Y image data, U image data, and V image data as image data of the YUV color space. Then, the first, second, and third encoding circuits respectively encode the Y image data, the U image data, and the V image data to generate Y compressed data, U compressed data, and V compressed data corresponding to the Y image data, the U image data, and the V image data, as compressed data.

FIG. 10B is a block diagram of an example showing the configuration of the image decompression circuit shown in FIG. 9. The image decompression circuit 96 shown in FIG. 10B includes first, second and third decoding circuits 140, 142, and 144 as decoding circuits, and an inverse color space conversion circuit 146.

In the image decompression circuit 96, the first, second and third decoding circuits 140, 142, and 144 respectively decode the Y compressed data, the U compressed data, and the V compressed data to generate Y image data, U image data, and V image data corresponding to the Y compressed data, the U compressed data, and the V compressed data, as decompressed data. Then, the inverse color space conversion circuit 146 inversely converts the Y image data, the U image data, and the V image data, so that the image data of the YUV color space is generated as the image data of the RGB color space.

FIG. 11 is a block diagram of an example showing the configuration of the encoding circuits shown in FIG. 10A. An encoding circuit 116 shown in FIG. 11 includes a quantization circuit 118, a first prediction circuit 120, and an entropy encoding circuit 122.

In the encoding circuit 116, the quantization circuit 118 generates quantized data by quantizing image data based on a quantization coefficient. Then, the first prediction circuit 120 generates differential data by subtracting quantized data, which is held in a data holding circuit and corresponds to an image temporally before the current image, from the quantized data generated by the quantization circuit 118. Then, the entropy encoding circuit 122 generates compressed data by entropy-encoding the differential data.

FIG. 12 is a block diagram of an example showing the configuration of the decoding circuits shown in FIG. 10B. A decoding circuit 124 shown in FIG. 12 includes an entropy decoding circuit 126, a second prediction circuit 128, and a dequantization circuit 130.

In the decoding circuit 124, the entropy decoding circuit 126 generates differential data by entropy-decoding the compressed data. Then, the second prediction circuit 128 generates quantized data by adding up the differential data generated by the entropy decoding circuit 126 and the quantized data which is held in a data holding circuit and corresponds to an image temporally before the current image. Then, the dequantization circuit 130 generates decompressed data by dequantizing the quantized data.

Arithmetic expressions of quantization and dequantization are shown, for example, as Formulae (1) and (2). For example, it is assumed that the quantization is simple one in which lower bit components of image data are truncated to round off the image data.

$$\text{Quantization: Quant}=\text{Floor}((\text{In}+Q/2)/Q) \qquad (1)$$

$$\text{Dequantization: DeQuant}=\text{Quant}\times Q \qquad (2)$$

Here, In is input data, and Q is the value of a quantization coefficient.

In the above-described quantization in which lower bit components of image data are truncated, if the value Q of the quantization coefficient increases, the gradation of an image before compression processing changes smoothly as shown in FIG. 13. However, as shown in FIG. 14, the gradation of an image after compression and decompression changes stepwise, and therefore, the degradation of image quality is obvious. The reason therefor is that the smooth gradation of the image before compression processing collapses in the image after compression and decompression since values after quantization and dequantization are uniquely determined by input values.

Meanwhile, there is a technique called dithering that suppresses visual image degradation due to quantization error. In dithering, when quantization is performed, the lower bit components of image data is not truncated to simply round off the image data, but in the image data, for example, rounding-down or rounding-up of the lower bit components is controlled so as to reduce visual error. As one of the dithering, there is random number dithering.

FIG. 15 is a block diagram of an example showing the configuration of a random number dithering circuit. A random number dithering circuit 132 shown in FIG. 15 includes a pseudo random number generation circuit 134, an adder 136, and a quantization circuit 138.

In the random number dithering circuit 132, on the basis of a value Q of a quantization coefficient, the pseudo random number generation circuit 134 generates a pseudo random number in a range of 0 to Q−1. Then, the adder 136 generates addition data by adding up the image data and the pseudo random number, and the quantization circuit 138 generates quantized data by quantizing the addition data based on the quantization coefficient.

Arithmetic expressions quantization and dequantization are shown, for example, as Formulae (3) and (4). In the random number dithering circuit 132, addition of the pseudo random number is performed instead of rounding-off of image data.

$$\text{Quantization: Quant}=\text{Floor}((\text{In}+\text{Rand}(Q))/Q) \qquad (3)$$

$$\text{Dequantization: DeQuant}=\text{Quant}\times Q \qquad (4)$$

Here, Rand(Q) is a pseudo random number generated based on the value Q of the quantization coefficient by the pseudo random number generation circuit 134.

As shown in Formulae (1) and (2), in simple quantization in which the lower bit components of image data are truncated, a value Out of output data is uniquely determined with respect to a value In of input data, as shown in FIG. 16A. In FIGS. 16A and 16B, the value Q of the quantization coefficient is 4.

In contrast, as shown in Formulae (3) and (4), in the case of quantization based on the random number dithering, the value Out of the output data is stochastically determined to a value in the vicinity of the value In of the input data. Accordingly, spatially or temporally, the average value is saved. As shown in FIG. 16B, for example, when the value In of the input data is 3, assuming that the probability that the value Out of the output data is quantized to 0 is 25% and the probability that the value Out of the output data is quantized to 4 is 75%, the average value of the value Out of the output data is 3. Degradation of the appearance of an image can be reduced by the characteristic that is "reversible on the average".

FIG. 17 illustrates an image obtained after compression and decompression by quantization based on conventional random number dithering. The image shown in FIG. 17 is one obtained by applying the conventional random number dithering to the image shown in FIG. 13, and it can be seen that stepwise differences in gradation have been greatly removed compared with the image shown in FIG. 14.

In an image obtained by quantization based on the random number dithering, however, there is a problem that noise due to a pseudo random number is visually recognized like a pattern. This is because the manner of dithering varies depending on the gradation of the input value such that, for example, the output data is always quantized to 0 when the input value is 0, the output data is subjected to dithering with a probability of 25%:75% when the input value is 1, and the output data is subjected to dithering with a probability of 50%:50% when the input value is 2, as shown in FIG. 16E. For this reason, deviation arises in the quantization error, and the deviation is visually recognized like a pattern.

As prior art documents relevant to the present invention, there are JP 2013-195784 A, JP 2003-44847 A, JP 61-161871 A, JP 5-219384 A, and JP 2006-50299 A.

For example, JP 2013-195784 A describes that the undulation phenomenon, in which pseudo contour and stepwise differences in gradation are visually recognized as undulation, is eliminated by performing dithering using a random number.

JP 2003-44847 A describes that the effect of dithering in the vertical direction is obtained by switching the method of quantization among a plurality of lines.

SUMMARY OF THE INVENTION

An object of the present invention is to provide an image processing apparatus capable of obtaining a high-quality image by preventing the gradation from changing stepwise in an image after compression and decompression or by preventing a pattern from being generated due to deviation of noise caused by a pseudo random number in an image after compression and decompression.

In order to achieve the above-mentioned object, the present invention provides an image processing apparatus, comprising:

a first random number seed generation circuit that generates a first random number seed, which corresponds to a number of a line or a block of an image corresponding to first image data, based on a first image synchronization signal for each line or block;

an image compression circuit that generates a first pseudo random number based on the first random number seed, and generates compressed data by quantizing and encoding addition data acquired by adding up of the first image data and the first pseudo random number for each pixel corresponding to the line or the block;

an image memory that stores the compressed data;

a synchronization signal generation circuit that generates a second image synchronization signal;

a second random number seed generation circuit that generates a second random number seed, which corresponds to the number of the line or the block and is equal to the first random number seed, based on the second image synchronization signal for each line or block; and an image decompression circuit that generates decompressed data by decoding and dequantizing the compressed data read from the image memory, generates a second pseudo random number equal to the first pseudo random number based on the second random number seed, and generates second image data by subtracting the second pseudo random number from the decompressed data for the each pixel.

In the present invention, first and second random number seed generation circuits generate the same random number seed for each line for an image compression circuit and an image decompression circuit, and the image compression circuit and the image decompression circuit generate a pseudo random number for each pixel based on the random number seed. The image compression circuit generates compressed data by quantizing the addition data of the image data and the pseudo random number using a quantization coefficient, and the image decompression circuit subtracts the pseudo random number from the decompressed data after dequantization using the quantization coefficient. Thereby, according to the present invention, in an image after compression and decompression, it is possible to prevent the gradation from changing stepwise or it is possible to prevent a pattern from being generated due to deviation of noise caused by a pseudo random number, and therefore, it is possible to obtain visually better display quality than that in the prior art.

Further, in the present invention, a random number seed corresponding to the number of each line or block of an image is generated based on an image synchronization signal. Thereby, according to the present invention, since the random number seed is shared between the image compression circuit and the image decompression circuit, for example, there is no need to embed the random number seed in compressed data. As a result, it is possible to share the random number seed between the image compression circuit and the image decompression circuit without increasing the amount of compressed data.

DETAILED DESCRIPTION OF THE INVENTION

Hereinafter, an image processing apparatus of the present invention will be described in detail based on a preferred embodiment shown in the accompanying drawings.

Figure 1:
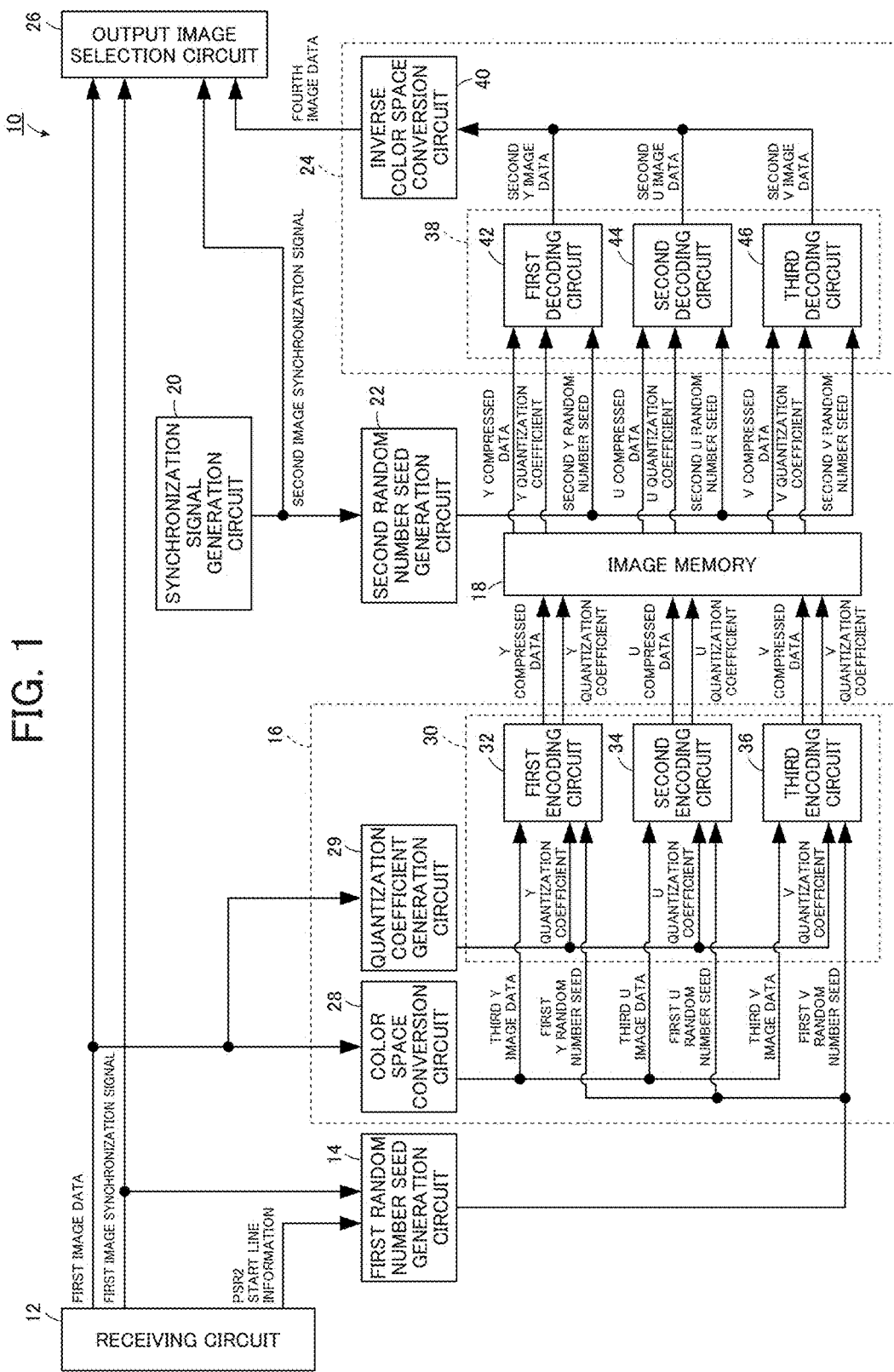
FIG. 1 is a block diagram of an embodiment showing the configuration of an image processing apparatus of the present invention.

FIG. 1 is a block diagram of an embodiment showing the configuration of the image processing apparatus of the present invention. An image processing apparatus 10 shown in FIG. 1 is a reception side circuit for performing compression and decompression processing on image data, which is transmitted through a transmission path from a transmission side circuit of an image output apparatus, in compliance with the Embedded DisplayPort Standard, and includes a receiving circuit 12, a first random number seed generation circuit 14, an image compression circuit 16, an image memory 16, a synchronization signal generation circuit 20, a second random number seed generation circuit 22, an image decompression circuit 24, and an output image selection circuit 26.

The Embedded DisplayPort Standard is one of the interface standards for connecting the output of the image output apparatus, which is generated by a graphics processing unit (GPU) or the like, to the image display apparatus, and was formulated by Video Electronics Standards Association (VESA) that is a standardization group with respect to interface standard of video signals. In DisplayPort, the transmission side circuit and the reception side circuit are connected by the transmission path which is configured to include a main link of a maximum of four lanes and an auxiliary channel, and serial data in which image data and the like are packetized is transmitted and received therebetween.

The receiving circuit 12 receives first image data, a first image synchronization signal, PSR2 start line information, and the like that are transmitted from the transmission side circuit.

The first image synchronization signal is a signal for determining the display timing of an image in the horizontal and vertical directions in the case of displaying an image corresponding to the first image data on the image display apparatus.

In the case of displaying an image using the function of PSR2, information indicating the position of a rectangular region to be updated is transmitted to the reception side circuit from the transmission side circuit. The PSR2 start line information is information indicating the number of the start line of the rectangular region to be updated among the pieces of information indicating the position of the rectangular region to be updated.

Then, for each line of an image corresponding to the first image data received by the receiving circuit 12, the first random number seed generation circuit 14 generates a first random number seed corresponding to the number of the relevant line based on the first image synchronization signal which is also received by the receiving circuit 12.

In the case of the present embodiment, as the first random number seed, the first random number seed generation circuit 14 generates a first Y random number seed, a first U random number seed, and a first V random number seed corresponding to third Y image data, third U image data, and third V image data of the YUV color space converted by a color space conversion circuit 28 to be described later.

Then, for each pixel corresponding to the line, the image compression circuit 16 generates a first pseudo random number based on the first random number seed generated by the first random number seed generation circuit 14 and a quantization coefficient generated by a quantization coefficient generation circuit, and generates compressed data by encoding the addition data of third image data and the first pseudo random number by quantization using the quantization coefficient. The image compression circuit 16 includes the color space conversion circuit 28, a quantization coefficient generation circuit 29, and an encoding circuit 30.

The color space conversion circuit 28 converts the first image data of the RGB color space into the third image data of the YUV color space.

In the case of the present embodiment, the color space conversion circuit 28 converts the first image data of the RGB color space into third Y image data, third U image data, and third V image data as the third image data of the YUV color space.

The quantization coefficient generation circuit 29 generates a quantization coefficient of YUV for each line or pixel by calculating the compression ratio from the first image data of the RGB color space.

Figure 2:
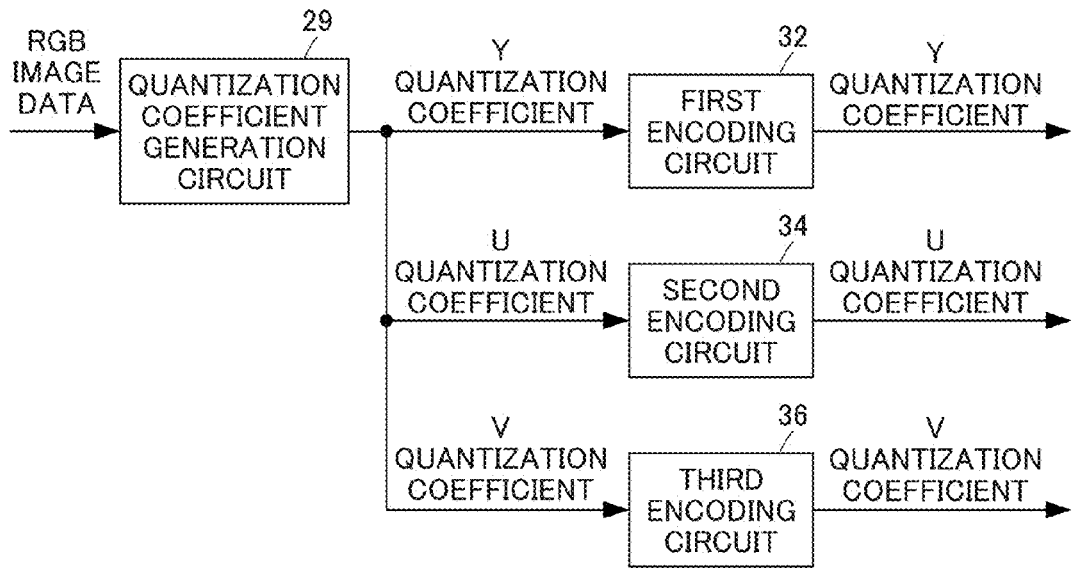
FIG. 2 is a block diagram of an example showing a peripheral configuration of a quantization coefficient generation circuit shown in FIG. 1.

In the case of the present embodiment, as shown in FIG. 2, the quantization coefficient generation circuit 29 generates a Y quantization coefficient, a U quantization coefficient, and a V quantization coefficient corresponding to the third Y image data, the third U image data, and the third V image data converted by the color space conversion circuit 28, as the quantization coefficient of YUV, from the first image data of the RGB color space.

The Y quantization coefficient, the U quantization coefficient, and the V quantization coefficient generated by the quantization coefficient generation circuit 29 are input to first, second, and third encoding circuits 32, 34, and 36 of the encoding circuit 30, respectively. The Y quantization coefficient, the U quantization coefficient, and the V quantization coefficient input to the first, second, and third encoding circuits 32, 34, and 36 are output from the first, second, and third encoding circuits 32, 34, and 36, respectively.

In FIG. 2, only the Y quantization coefficient, the U quantization coefficient, and the V Quantization coefficient, among input/output signals to/from the first, second, and third encoding circuits 32, 34, and 36, are shown, and other signals are omitted.

Then, the encoding circuit 30 generates compressed data by encoding the third image data of the YUV color space converted by the color space conversion circuit 28 based on the first random number seed and the quantization coefficient. The encoding circuit 30 includes the first, second, and third encoding circuits 32, 34, and 36.

The first, second, and third encoding circuits 32, 34, and 36 generate a first pseudo random number for each pixel based on the first Y random number seed, the first U random number seed, and the first V random number seed generated by the first random number seed generation circuit 14 and the Y quantization coefficient, the U quantization coefficient, and the V quantization coefficient generated by the quantization coefficient generation circuit 29; generate addition data by adding up the third Y image data, the third U image data, and the third V image data converted by the color space conversion circuit 28 and the first pseudo random number; generate quantized data by quantizing the addition data with the Y quantization coefficient, the U quantization coefficient, and the V quantization coefficient; generate differential data by subtracting quantized data corresponding to an image temporally before the current image from the quantized data; and generate corresponding Y compressed data, U compressed data, and V compressed data by entropy-encoding the differential data, respectively.

Then, the image memory 18 stores the compressed data generated by the encoding circuit 30 and the quantization coefficients.

In the case of the present embodiment, the image memory 18 stores the Y compressed data, the U compressed data, and the V compressed data generated by the first, second, and third encoding circuits 32, 34, and 36, as compressed data, and the Y quantization coefficient, the U quantization coefficient, and the V quantization coefficient.

The Y compressed data, the U compressed data, and the V compressed data stored in the image memory 18 and the Y quantization coefficient, the U quantization coefficient, and the V quantization coefficient also stored in the image memory 18 are sequentially read according to the display timing of an image.

Then, the synchronization signal generation circuit 20 generates a second image synchronization signal.

The second image synchronization signal is a signal for determining the display timing of an image in the horizontal and vertical directions in the case of displaying the image, which corresponds to the compressed data read from the image memory 18, on the image display apparatus using the function of PSR or PSR2.

Then, the second random number seed generation circuit 22 generates a second random number seed, which corresponds to the number of the line and which is equal to the first random number seed, for each line based on the second image synchronization signal generated by the synchronization signal generation circuit 20.

In the case of the present embodiment, as the second random number seed, the second random number seed generation circuit 22 generates a second Y random number seed, a second U random number seed, and a second V random number seed corresponding to the Y compressed data, the U compressed data, and the V compressed data read from the image memory 18.

Then, for each pixel corresponding to the line, the image decompression circuit 24 codes the compressed data read from the image memory 18; generates decompressed data by performing dequantization using the read quantization coefficient; generates a second pseudo random number equal to the first pseudo random number based on the second random number seed generated by the second random number seed generation circuit 22 and the quantization coefficient; and generates second image data by subtracting the second pseudo random number from the decompressed data. The image decompression circuit 24 includes a decoding circuit 38 and an inverse color space conversion circuit 40.

The decoding circuit 38 generates a second pseudo random number for each pixel based on the second random number seed and the quantization coefficient, decodes the compressed data read from the image memory 18, and generates decompressed data by performing dequantization using the quantization coefficient. The decoding circuit 38 includes first, second, and third decoding circuits 42, 44, and 46.

The first, second, and third decoding circuits 42, 44, and 46 generate a second pseudo random number for each pixel based on the second Y random number seed, the second U random number seed, and the second V random number seed generated by the second random number seed generation circuit 22 and the Y quantization coefficient, the U quantization coefficient, and the V quantization coefficient; generate differential data by entropy-decoding the Y compressed data, the U compressed data, and the V compressed data read from the image memory 18; generate quantized data by adding up the differential data and quantized data corresponding to an image temporally before the current image; generate decompressed data by dequantizing the quantized data according to the Y quantization coefficient, the U quantization coefficient, and the V quantization coefficient; and generate second Y image data, second U image data, and second V image data as the second image data of the YUV color space by subtracting the second pseudo random number from the decompressed data, respectively.

Then, the inverse color space conversion circuit 40 converts the second image data of the YUV color space generated by the decoding circuit 38 into fourth image data of the RGB color space.

In the case of the present embodiment, the inverse color space conversion circuit 40 converts the second Y image data, the second U image data, and the second V image data of the YUV color space generated by the first, second, and third decoding circuits 42, 44, and 46 into the fourth image data of the RGB color space.

Then, the output image selection circuit 26 outputs the first image data and the first image synchronization signal received by the receiving circuit 12 in the case of normal operation other than a case of displaying an image using the function of PSR or PSR2, and outputs the fourth image data generated by the image decompression circuit 24 and the second image synchronization signal generated by the synchronization signal generation circuit 20 in the case of displaying an image using the function of PSR or PSR2.

Figure 3:
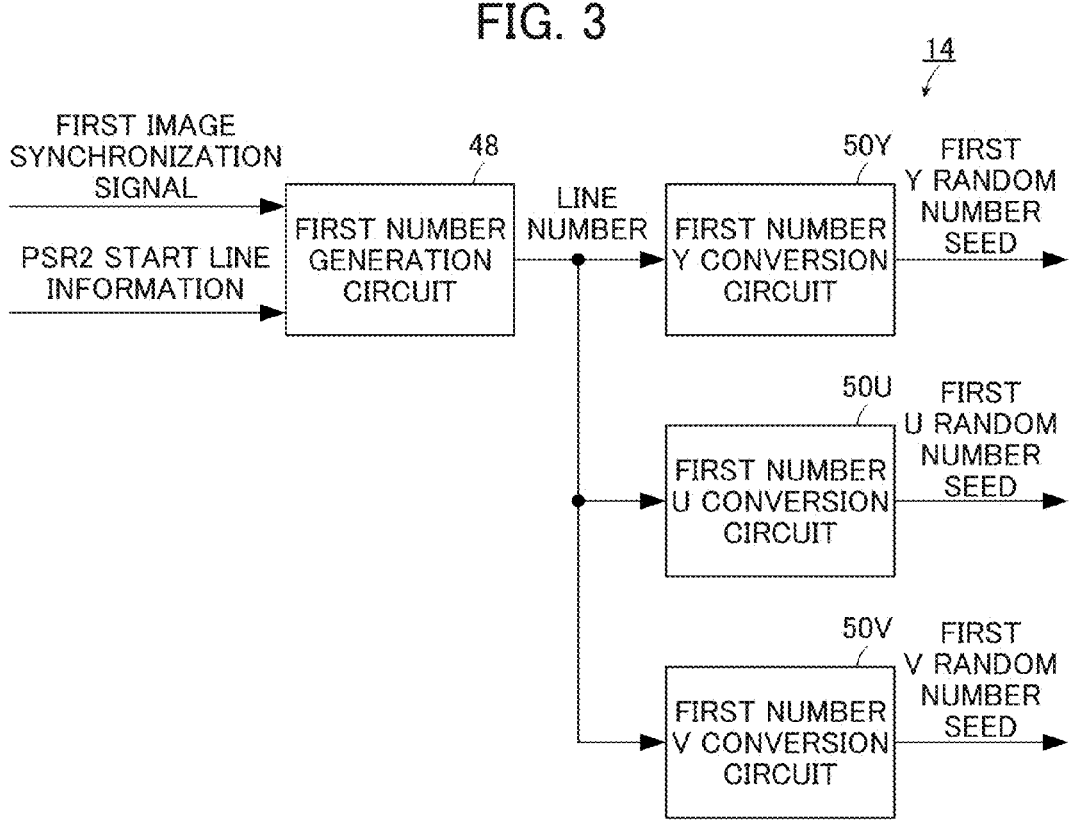
FIG. 3 is a block diagram of an embodiment showing the configuration of a first random number seed generation circuit shown in FIG. 1.

Next, FIG. 3 is a block diagram of an embodiment showing the configuration of the first random number seed generation circuit shown in FIG. 1. The first random number seed generation circuit 14 shown in FIG. 3 includes a first number generation circuit 48, a first number Y conversion circuit 50Y, a first number U conversion circuit 50U, and a first number V conversion circuit 50V.

Based on the first image synchronization signal received by the receiving circuit 12, for each line, the first number generation circuit 48 generates the number of the relevant line of an image corresponding to the first image data also received by the receiving circuit 12.

In the case of displaying an image using the function of PSR, the first number generation circuit 48 generates a corresponding line number for each line of the image, for example, by resetting the line number to 0 on the basis of a vertical synchronization signal (Vsync) included in the first image synchronization signal and counting up the line number on the basis of a data enable signal (DE) included in the first image synchronization signal.

In the case of displaying an image using the function of PSR2, a corresponding line number is generated for each line of a rectangular region to be updated, for example, by setting the number of the start line of the rectangular region to be updated as the line number based on PSR2 start line information and counting up the line number on the basis of the DE.

Then, the first number Y conversion circuit 50Y generates a first Y random number seed for each line by converting the line number generated by the first number generation circuit 48 based on a first conversion formula.

The first number Y conversion circuit 50Y is disposed for the purpose of obtaining a high-quality pseudo random number sequence without deviation by preventing a correlation between pseudo random number sequences for different lines due to approximate values of the first Y random number seed for the lines, with the sequences being generated by a pseudo random number generation circuit 52 to be described later.

It is assumed that the first conversion formula is set in the first number Y conversion circuit 50Y in advance.

An example of the first conversion formula used in the first number Y conversion circuit 50Y is shown as Formulae (5) to (7).

$$V0 = ((\text{not } L) << 8) \text{ xor } L \tag{5}$$

$$V1 = 0x5a82 * (V0 \text{ xor } (V0 << 9) \text{ xor } (V0 << 3)) \tag{6}$$

$$S = (V1 >> 4) \text{ and } 0x\textit{ffff} \tag{7}$$

Here, L represents the line number, S represents the first Y random number seed (16 bits), V0 and V1 each represent an intermediate variable, "not" means bit inversion, "and" means logical AND, "xor" means exclusive OR, "<<" means left bit shift, ">>" means right bit shift, and "×" means multiplication.

The value of the first Y random number seed calculated by the first conversion formula is shown in Table 1.

TABLE 1

| Number of line | 0 | 1 | 2 | 3 | 4 | 5 | 6 | 7 |
|---|---|---|---|---|---|---|---|---|
| First Y random number seed | 22752 | 37993 | 53234 | 44027 | 51460 | 33421 | 33046 | 56095 |

By altering the first conversion formula, the value of the first Y random number seed generated by the first number Y conversion circuit 50Y is changed, and as a result, it is possible to change the pattern of random number dithering. By using this, it is also possible to average the quantization error of the first quantized data generated by a quantization circuit 56, which will be described later, in the time axis direction, for example, by converting the line number generated by the first number generation circuit 48 based on the first conversion formula, which varies with frame, and changing the pattern of random number dithering for each frame.

The reason for generating the random number seed corresponding to the number of each line of the image is that, in the case of displaying an image using the function of PSR2, it is necessary to independently perform encoding and decoding of image data by the line. By generating the random number seed corresponding to the number of each line, the random number seed is shared between the image compression circuit 16 and the image decompression circuit 24. Therefore, for example, there is no need to embed the random number seed in compressed data, and as a result, it is possible to share the random number seed between the image compression circuit 16 and the image decompression circuit 24 without increasing the amount of compressed data.

Each of the first number U conversion circuit 50U and the first number V conversion circuit 50V has the same configuration as the first number Y conversion circuit 50Y, except that the first number U conversion circuit 50U and the first number V conversion circuit 50V generate the first U random number seed and the first V random number seed, respectively, instead of generating the first Y random number seed.

Figure 4:
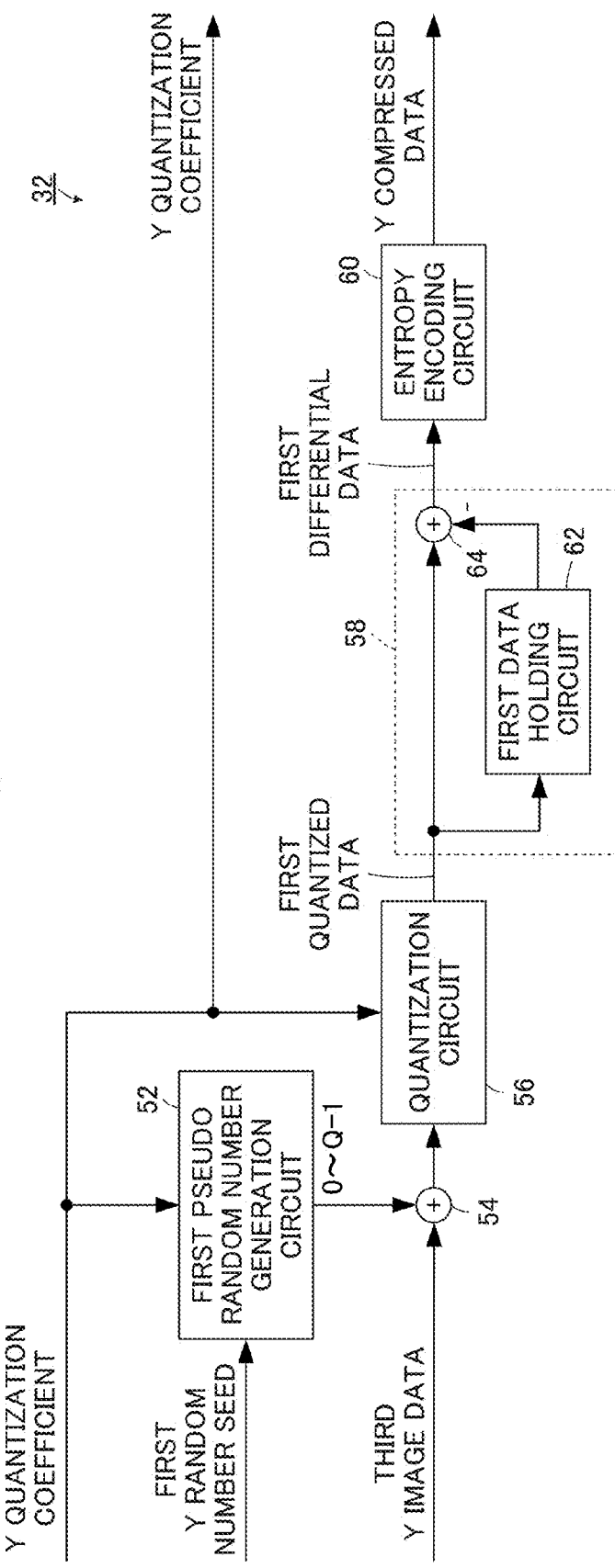
FIG. 4 is a block diagram of an embodiment showing the configuration of a first encoding circuit shown in FIG. 1.

Next, FIG. 4 is a block diagram of an embodiment showing the configuration of the first encoding circuit shown in FIG. 1. The first encoding circuit 32 shown in FIG. 4 includes the first pseudo random number generation circuit 52, a first adder 54, the quantization circuit 56, a first prediction circuit 58, and an entropy encoding circuit 60.

The first pseudo random number generation circuit 52 generates a first pseudo random number in a range of 0 to "value Q of Y quantization coefficient−1" for each pixel, based on the first Y random number seed generated by the first random number seed generation circuit 14 and the Y quantization coefficient.

In order to generate a pseudo random number, a pseudo random number generation method using a linear feedback shift register (LFSR) is used.

Figure 5:
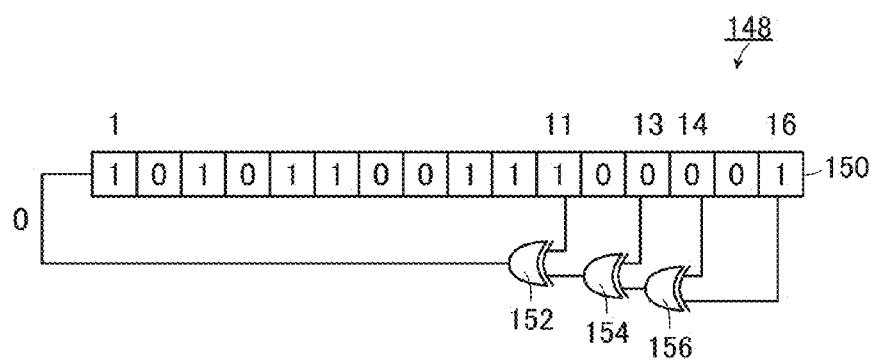
FIG. 5 is a circuit diagram of an example showing the configuration of a linear feedback shift register.

FIG. 5 is a circuit diagram of an example showing the configuration of a linear feedback shift register. A linear feedback shift register 148 shown in FIG. 5 includes a 16-bit shift register 150 and three EXOR circuits 152, 154, and 156.

In the linear feedback shift register 148, a value $X_0$ of the first Y random number seed is set in the shift register 150 for each line. Therefore, the initial value of the shift register 150 is reset to the value $X_0$ of the first Y random number seed for each line.

When first bit, second bit, . . . , and 16th bit are assumed from the leftmost bit of the shift register 150, as shown in Formula (8), as a new value $X_n[1]$ (n representing the number of a pixel) to be input to the first bit next, an exclusive OR of values of 4 bits comprising 11th bit, 13th bit, 14th bit, and 16th bit in the value $X_0$ of the first Y random number seed set in the shift register 150 is calculated for each pixel by the EXOR circuits 152, 154, and 156. In the case of an example shown in FIG. 5, values of the 11th bit, 13th bit, 14th bit, and 16th bit are 1, 0, 0, and 1, respectively, and output signals of the EXOR circuits 156, 154, and 152 are 1, 1, and 0, respectively.

Then, the new value $X_n[1]$ is set in the first bit of the shift register 150, and as shown in Formula (9), the values of the first to 15th bits set in the shift register 150 before the new value $X_n[i]$ is input to the first bit of the shift register 150 are shifted by one bit to the second to 16th bits so that a new value $X_n[i]$ (i representing bit position of the second, to 16th bits of the shift register 150) is set in each of the second, to 16th bits.

Then, as shown in Formula (10), the remainder as a result obtained by dividing a new value $X_n$ comprising $X_n[1]$ and $X_n[i]$ and set in the shift register 150 by the value Q of the Y quantization coefficient is calculated as a random number Rand(Q).

Thereafter, until the value of the first Y random number seed of the next line is input, the above-described operation is repeated for each pixel, so that the values of 16 bits set in the shift register 150 are sequentially updated to generate a pseudo random number.

$$X_n[1]=X_{n-1}[16] \text{ xor } X_{n-1}[14] \text{ xor } X_{n-1}[13] \text{ xor } X_{n-1}[11] \quad (8)$$

$$X_n[i]=X_{n-1}[i-1] \text{ (}i\text{ being an integer of 2 to 16)} \quad (9)$$

$$\text{Rand}(Q)=X_n \bmod Q \quad (10)$$

Here, "mod" is an operator to output remainder of division as an operation result.

For example, in a case where the value of the first Y random number seed is 44257 and the value Q of the Y quantization coefficient is 8, the pseudo random number Rand(Q) used in processing of the n-th pixel is generated as shown in Table 2.

TABLE 2

| n | 0 | 1 | 2 | 3 | 4 | 5 | 6 | 7 |
|---|---|---|---|---|---|---|---|---|
| Xn | 44257 | 22979 | 45959 | 26383 | 52766 | 39996 | 14457 | 28914 |
| Rand(Q) | 1 | 3 | 7 | 7 | 6 | 4 | 1 | 2 |

In the case of the present embodiment, as a quantization coefficient, a value required to achieve an intended compression ratio is generated for each line or pixel by the quantization coefficient generation circuit 29 based on an image. For example, a quantization coefficient is included in compressed data and is stored in the image memory 18, so that the quantization coefficient is shared between the encoding circuit 30 and the decoding circuit 38.

Then, the first adder 54 generates addition data by adding up the third Y image data and the first pseudo random number, which has been generated by the first pseudo random number generation circuit 52, for each pixel.

Then, the quantization circuit 56 generates first quantized data by quantizing the addition data generated by the first adder 54 using the Y quantization coefficient, for each pixel.

Then, the first prediction circuit 58 generates first differential data by subtracting first quantized data corresponding to an image, which is temporally before the current image, from the first quantized data generated by the quantization circuit 56, for each pixel. The first prediction circuit 58 includes a first data holding circuit 62 and a second subtractor 64.

The first data holding circuit 62 holds the first quantized data corresponding to an image, which is temporally before the current image, for each pixel.

Then, the second subtractor 64 generates first differential data by subtracting the first quantized data held in the first data holding circuit 62 from the first quantized data generated by the quantization circuit 56, for each pixel.

The first prediction circuit 58 is used for the purpose of improving encoding efficiency. Image data of photos, computer graphics (CG), and the like generally have a characteristic that adjacent pixels have similar values, that is, there is a correlation between adjacent pixels. For this reason, differences between adjacent pixels concentrate on a value close to zero. Therefore, it is possible to reduce the amount of data by calculating the difference between pieces of image data of adjacent pixels and performing variable length encoding in which a short code is assigned to a value close to zero.

In the case of the present embodiment, the first prediction circuit 58 calculates a difference between pieces of first quantized data of temporally adjacent pixels. Calculating the difference between the pieces of first quantized data of adjacent pixels in this manner is the simplest example of method of predicting the input pixel which is temporally next. As a more complicated prediction method, there is the LOCO-I algorithm on which the JPEG-LS standard is based. If the accuracy of prediction is high, differences concentrate closer to zero, and accordingly, compression to shorter codes is possible.

Then, the entropy encoding circuit 60 generates Y compressed data by entropy-encoding the first differential data generated by the first prediction circuit 58 for each pixel.

Entropy encoding is to perform compression by assigning codes of different lengths according to the occurrence probability of image data, and is also called variable length encoding. A simple entropy encoding can be exemplified by unary coding. As shown in Formula (11), the integer n in a unary code $\alpha$ is expressed in n bits in total, that is to say, (n−1) time-repeated "zeros" followed by a "one" as the least significant bit. As n decreases, the code length decreases. A more efficient entropy encoding method, such as Golomb coding, may also be adopted.

$$\alpha(n)=(n-1) \text{ time-repeated "zeros"+a "one"} \quad (11)$$

Each of the second and third encoding circuits 34 and 36 has the same configuration as the first encoding circuit 32, except that the first U random number seed and the first V random number seed are used instead of the first Y random number seed, the U quantization coefficient and the V quantization coefficient are used instead of the Y quantization coefficient, the third U image data and the third V image data are used instead of the third Y image data, and the U compressed data and the V compressed data are generated instead of the Y compressed data.

In the case of the present embodiment, compression processing of a method in which quantization is directly applied is performed on image data without performing conversion into the frequency domain that is performed in Joint Photographic Experts Group (JPEG). However, conversion into the frequency domain may also be performed for quantization. Although prediction and entropy encoding are performed in order to further reduce the amount of data after quantizing the image data, it is not essential to perform prediction and entropy encoding.

Figure 6:
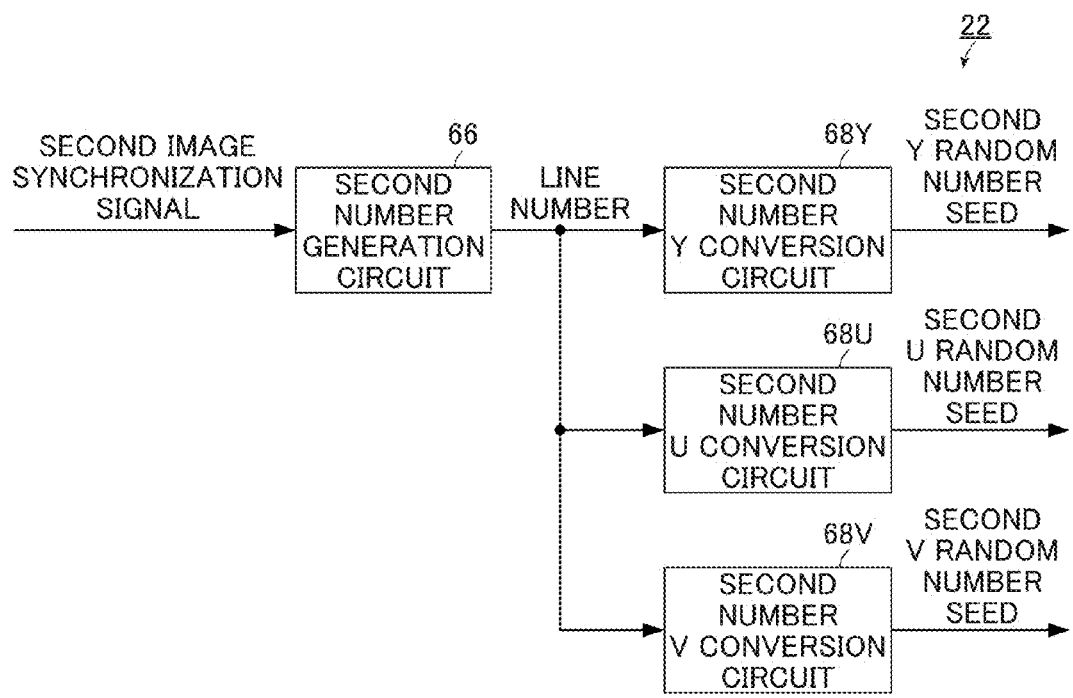
FIG. 6 is a block diagram of an embodiment showing the configuration of a second random number seed generation circuit shown in FIG. 1.

Next, FIG. 6 is a block diagram of an embodiment showing the configuration of the second random number seed generation circuit shown in FIG. 1. The second random number seed generation circuit 22 shown in FIG. 6 includes a second number generation circuit 66, a second number Y conversion circuit 68Y, a second number U conversion circuit 68U, and a second number V conversion circuit 68V.

The second number generation circuit 66 generates the number of a line of the image corresponding to the compressed data read from the image memory 18 based on the second image synchronization signal, generated by the synchronization signal generation circuit 20, for each line.

In the case of displaying an image using the function of PSR or PSR2, the second number generation circuit 66 generates a corresponding line number for each line of the image, for example, by resetting the line number to 0 on the basis of the Vsync included in the second image synchronization signal and counting up the line number on the basis of the DE included in the second image synchronization signal.

Then, the second number Y conversion circuit 68Y generates a second Y random number seed for each line by converting the line number generated by the second number generation circuit 66 based on a second conversion formula equal to the first conversion formula.

It is assumed that the second conversion formula is set in the second number Y conversion circuit 68Y in advance.

The second number Y conversion circuit 68Y can generate the second Y random number seed equal to the first Y random number seed for each line by converting the line number using the second conversion formula equal to the first conversion formula.

Each of the second number U conversion circuit 68U and the second number V conversion circuit 68V has the same configuration as the second number Y conversion circuit 68Y, except that the second U random number seed and the second V random number seed are generated instead of the second Y random number seed.

Figure 7:
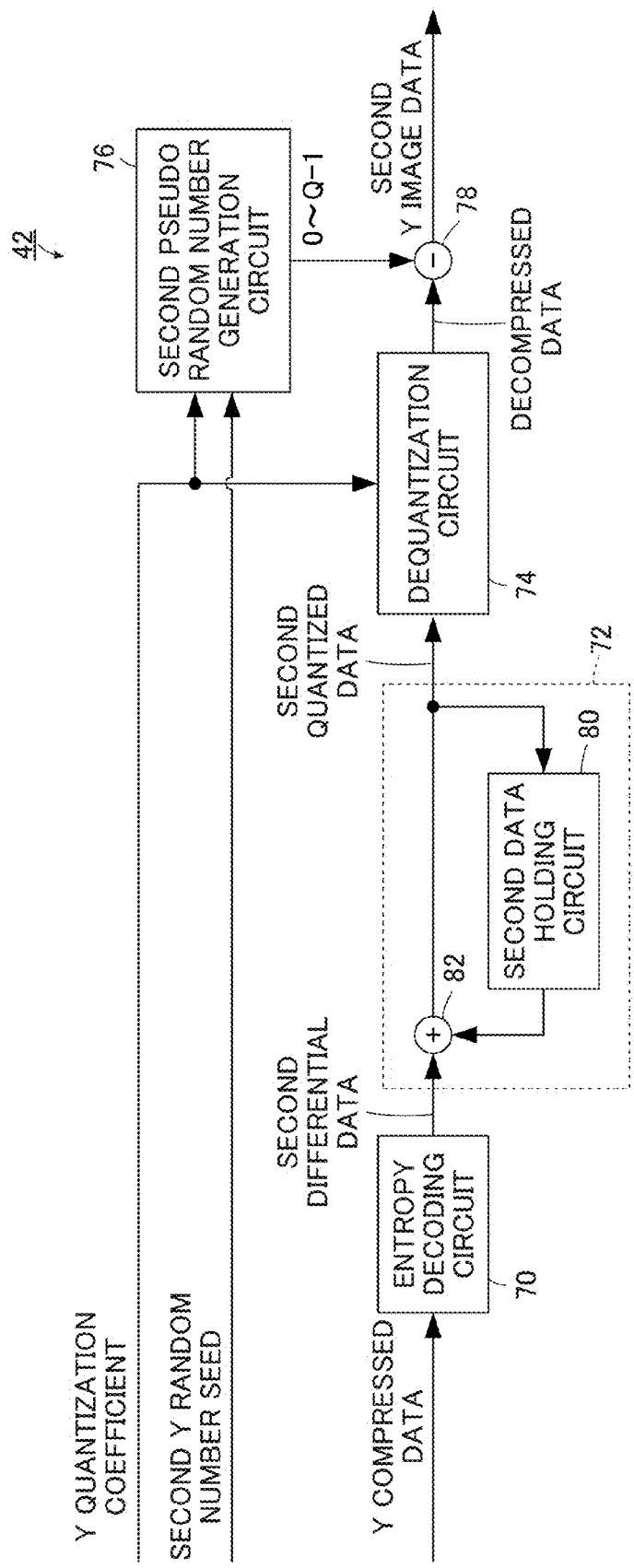
FIG. 7 is a block diagram of an embodiment showing the configuration of a first decoding circuit shown in FIG. 1.

Next, FIG. 7 is a block diagram of an embodiment showing the configuration of the first decoding circuit shown in FIG. 1. The first decoding circuit 42 shown in FIG. 7 includes an entropy decoding circuit 70, a second prediction circuit 72, dequantization circuit 74, a second pseudo random number generation circuit 76, and a first subtractor 78.

The entropy decoding circuit 70 generates second differential data by entropy-decoding the Y compressed data read from the image memory 18, for each pixel.

Then, the second prediction circuit 72 generates second quantized data by adding up the second differential data generated by the entropy decoding circuit 70 and the second quantized data corresponding to an image, which is temporally before the current image, for each pixel. The second prediction circuit 72 includes a second data holding circuit 80 and a second adder 82.

The second data holding circuit 80 holds the second quantized data corresponding to an image temporally before the current image.

Then, the second adder 82 generates second quantized data by adding up the second differential data generated by the entropy decoding circuit 70 and the second quantized data held in the second prediction circuit 72.

In the case of the present embodiment, the second Prediction circuit 72 calculates, in response to the first prediction circuit 58, a sum of the second differential data and the second quantized data with respect to temporally adjacent pixels.

Then, the dequantization circuit 74 generates decompressed data by dequantizing the second quantized data generated by the second prediction circuit 72 using the Y quantization coefficient, for each pixel.

Then, the second pseudo random number generation circuit 76 generates a second pseudo random number in a range of 0 to "value Q of Y quantization coefficient−1" for each pixel, based on the second Y random number seed generated by the second random number seed generation circuit 22 and the Y quantization coefficient.

The second pseudo random number generation circuit 76 can generate a second pseudo random number equal to the first pseudo random number by using the second Y random number seed equal to the first Y random number seed and the Y quantization coefficient.

Then, the first subtractor 78 generates second Y image data after compression and decompression of the third Y image data by subtracting the second pseudo random number generated by the second pseudo random number generation circuit 76 from the decompressed data generated by the dequantization circuit 74, for each pixel.

Each of the second and third decoding circuits 44 and 46 has the same configuration as the first decoding circuit 42, except that the U compressed data and the V compressed data are used instead of the Y compressed data, the second U random number seed and the second V random number seed are used instead of the second Y random number seed, the U quantization coefficient and the V quantization coefficient are used instead of the Y quantization coefficient, and the second U image data and the second V image data are generated instead of the Y second image data.

Next, the operation of the image processing apparatus 10 will be described.

In the case of normal operation, first image data and a first image synchronization signal are output from the output image selection circuit 26.

The first image data and the first image synchronization signal are supplied to the image display apparatus, and a moving image corresponding to first image data is displayed on the image display apparatus based on the first image synchronization signal.

In the case of displaying an image using the function of PSR, based on the first image synchronization signal, the first random number seed generation circuit 14 generates a first Y random number seed, a first U random number seed, and a first V random number seed, as first random number seeds, for each line.

In the first random number seed generation circuit 14, based on the first image synchronization signal, the first number generation circuit 48 generates the number of a line of an image corresponding to the first image data for each line.

Then, the first number Y conversion circuit 50Y, the first number U conversion circuit 50U, and the first number V conversion circuit 50V generate a first Y random number seed, a first U random number seed, and a first V random number seed by converting the line number based on the first conversion formula, for each line.

Further, the color space conversion circuit 28 converts the first image data of the RGB color space into third Y image data, third U image data, and third V image data as the third image data of the YUV color space.

Further, the quantization coefficient generation circuit 29 generates a quantization coefficient of YUV by calculating the compression ratio from the first image data of the RGB color space.

In the case of the present embodiment, the quantization coefficient generation circuit 29 generates a Y quantization coefficient, a U quantization coefficient, and a V quantization coefficient from the first image data of the RGB color space as the quantization coefficient of YUV.

Then, the first, second, and third encoding circuits 32, 34, and 36 of the encoding circuit 30 encode the third Y image data, the third U image data, and the third V image data based on the first Y random number seed, the first U random number seed, and the first V random number seed and the Y quantization coefficient, the U quantization coefficient, and the V quantization coefficient, and generate, as compressed data, Y compressed data, U compressed data, and V compressed data corresponding to the third Y image data, the third U image data, and the third V image data, respectively.

In the first encoding circuit 32, based on the first Y random number seed and the Y quantization coefficient, the first pseudo random number generation circuit 52 generates a first pseudo random number for each pixel.

Then, the first adder 54 generates addition data by adding up the third Y image data and the first pseudo random number for each pixel.

Then, the quantization circuit 56 generates first quantized data by quantizing the addition data using the Y quantization coefficient, for each pixel.

Then, the first prediction circuit 58 generates first differential data by subtracting first quantized data corresponding to an image, which is temporally before the current image, from the first quantized data for each pixel.

Then, the entropy encoding circuit 50 generates Y compressed data by entropy-encoding the first differential data for each pixel.

The second and third encoding circuits 34 and 36 operate similarly.

The Y compressed data, the U compressed data, and the V compressed data generated by the first, second, and third encoding circuits 32, 34, and 36 and the Y quantization coefficient, the U quantization coefficient, and the V quantization coefficient are stored in the image memory 18, for each pixel.

The Y compressed data, the U compressed data, and the V compressed data that are stored in the image memory 18, and the Y quantization coefficient, the U quantization coefficient, and the V quantization coefficient that are also stored in the image memory 18 are sequentially read for each pixel according to the display timing of an image.

The synchronization signal generation circuit 20 generates a second image synchronization signal.

Then, based on the second image synchronization signal, the second random number seed generation circuit 22 generates a second Y random number seed, a second U random number seed, and a second V random number seed, as second random number seeds, for each line.

In the second random number seed generation circuit 22, based on the second image synchronization signal, the second number generation circuit 66 generates the number of a line of the image corresponding to the compressed data read from the image memory 18 for each line.

Then, the second number Y conversion circuit 68Y, the second number U conversion circuit 68U, and the second number V conversion circuit 68V generate a second Y random number seed, a second U random number seed, and a second V random number seed by converting the line number based on the second conversion formula equal to the first conversion formula for each line.

Then, based on the second Y random number seed, the second U random number seed, and the second V random number seed and the Y quantization coefficient, the U quantization coefficient, and the V quantization coefficient, the first, second, and third decoding circuits 42, 44, and 46 of the decoding circuit 38 respectively decode the Y compressed data, the U compressed data, and the V compressed data read from the image memory 18 to generate, as second image data, second Y image data, second U image data, and second V image data corresponding to the Y compressed data, the U compressed data, and the V compressed data read from the image memory 18.

In the first decoding circuit 42, the entropy decoding circuit 70 generates second differential data by entropy-decoding the Y compressed data read from the image memory 18 for each pixel.

Then, the second prediction circuit 72 generates second quantized data by adding up the second differential data and second quantized data corresponding to an image, which is temporally before the current image, for each pixel.

Then, the dequantization circuit 74 generates decompressed data by dequantizing the second quantized data using the Y quantization coefficient for each pixel.

Then based on the second Y random number seed and the Y quantization coefficient, the second pseudo random number generation circuit 76 generates a second pseudo random number for each pixel.

Then, the first subtractor 78 generates second Y image data by subtracting the second pseudo random number from the decompressed data for each pixel.

The second and the third decoding circuits 44 and 46 operate similarly.

Then, the inverse color space conversion circuit 40 converts the second Y image data, the second U image data, and the second V image data, that is, the second image data of the YUV color space, into the fourth image data of the RGB color space.

Then, the fourth image data and the second image synchronization signal are output from the output image selection circuit 26.

The fourth image data and the second image synchronization signal are supplied to the image display apparatus, and a still image corresponding to the fourth image data is displayed on the image display apparatus based on the second image synchronization signal.

In the case of displaying an image using the function of PSR2, the first random number seed generation circuit 14 generates a first random number seed for each line, from a start line corresponding to the information of the start line. In this case, compressed data is generated by the image compression circuit 16 from the start line and stored in the image memory 18 (namely, updated) also from the start line. Operations other than the above are the same as in the case of displaying an image using the function of PSR.

Figure 8:
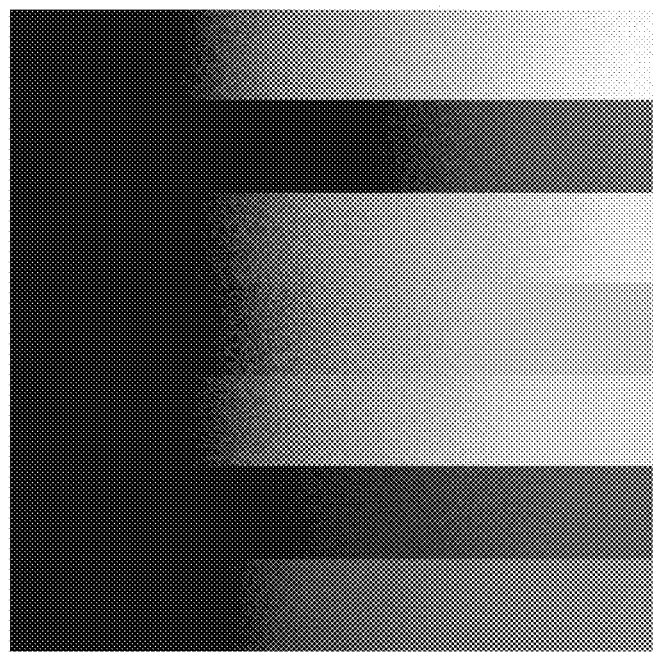
FIG. 8 represents an example showing an image obtained after compression and decompression using random number dithering of the present invention.
Figure 9:
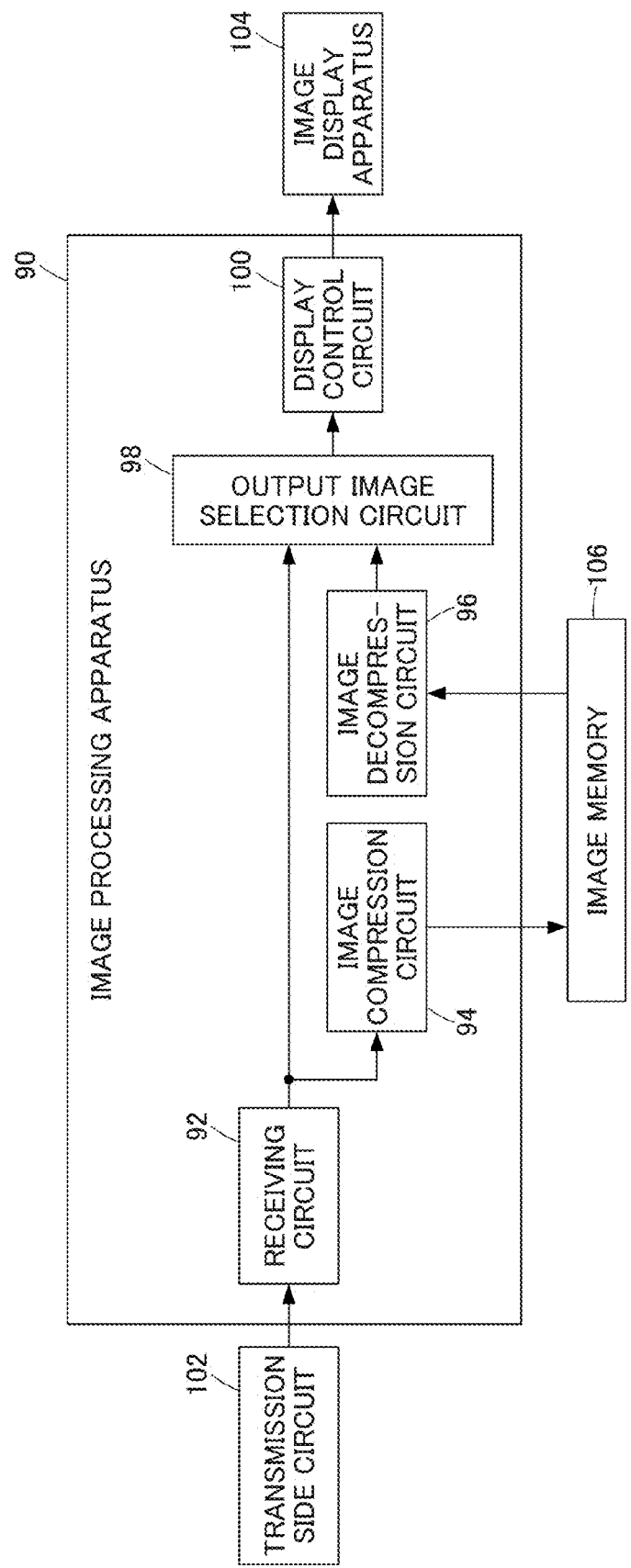
FIG. 9 is a block diagram of an example showing the configuration of an image processing apparatus of a liquid crystal display apparatus.
Figure 10A:
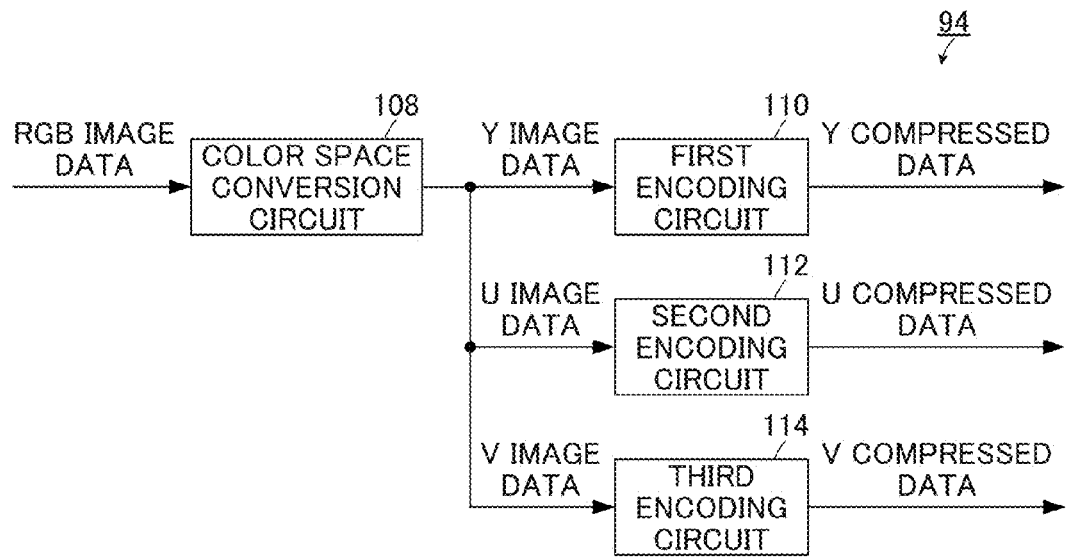
FIG. 10A is a block diagram of an example showing the configuration of an image compression circuit shown in FIG. 9.
Figure 10B:
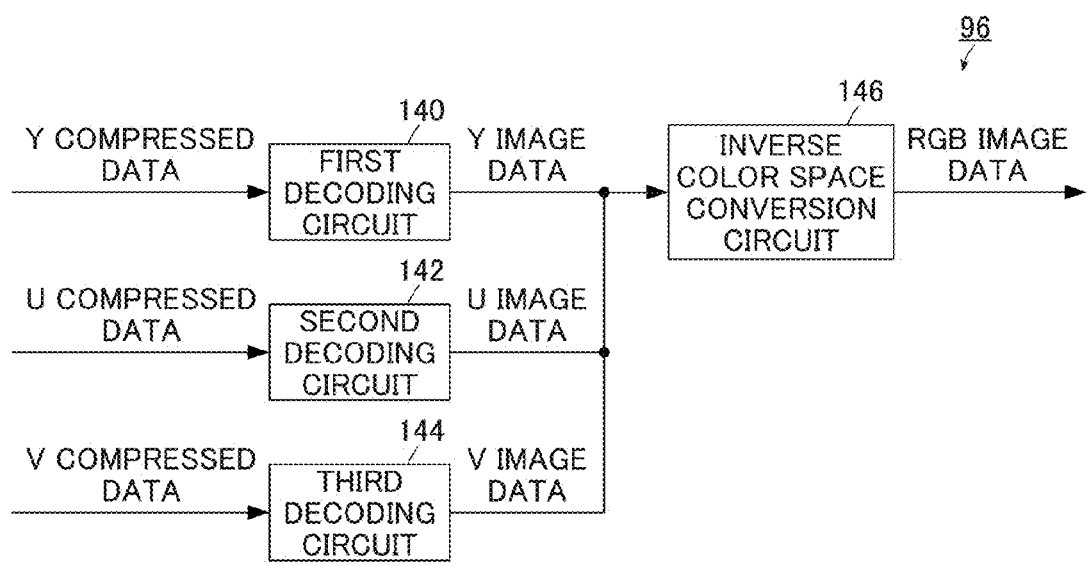
FIG. 10B is a block diagram of an example showing the configuration of an image decompression circuit shown in FIG. 9.
Figure 11:
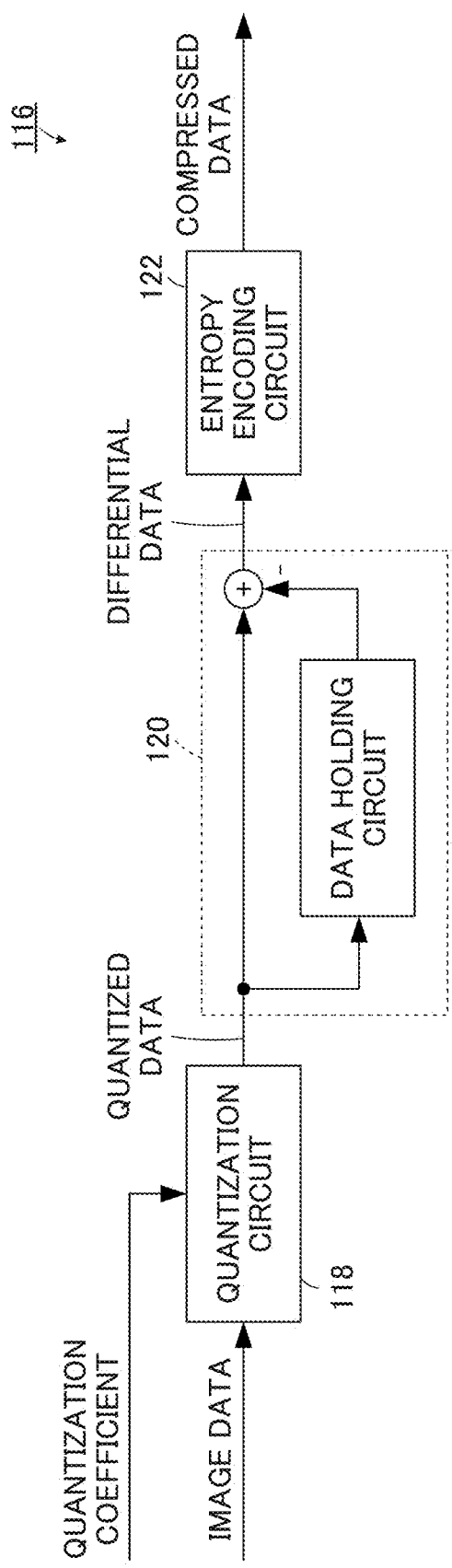
FIG. 11 is a block diagram of an example showing the configuration of encoding circuits shown in FIG. 10A.
Figure 12:
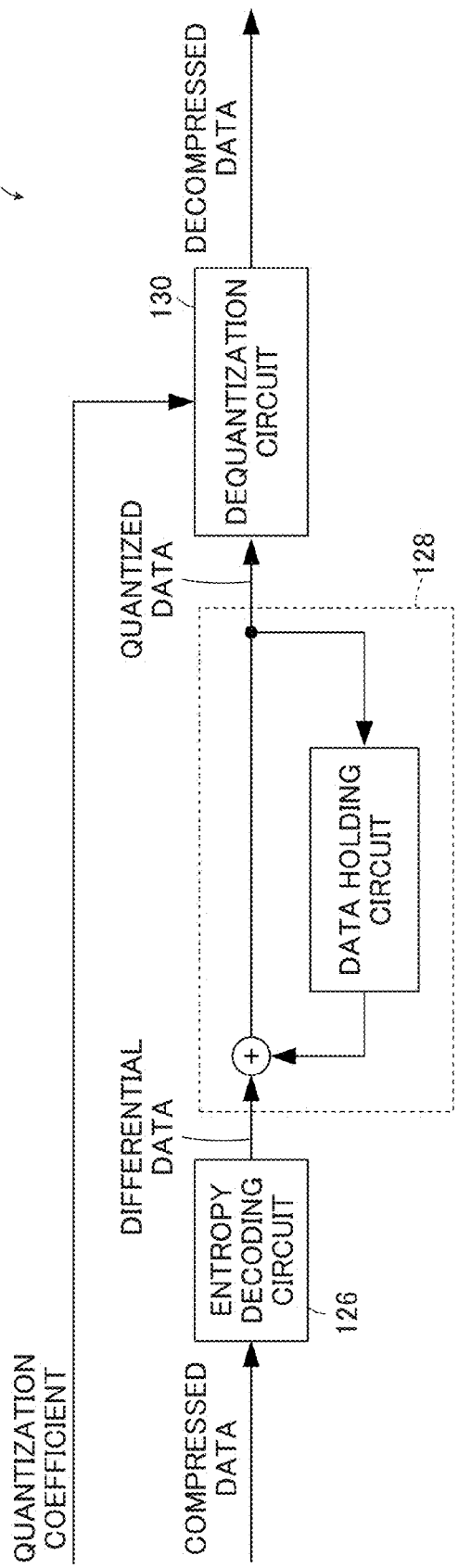
FIG. 12 is a block diagram of an example showing the configuration of decoding circuits shown in FIG. 10B.
Figure 13:
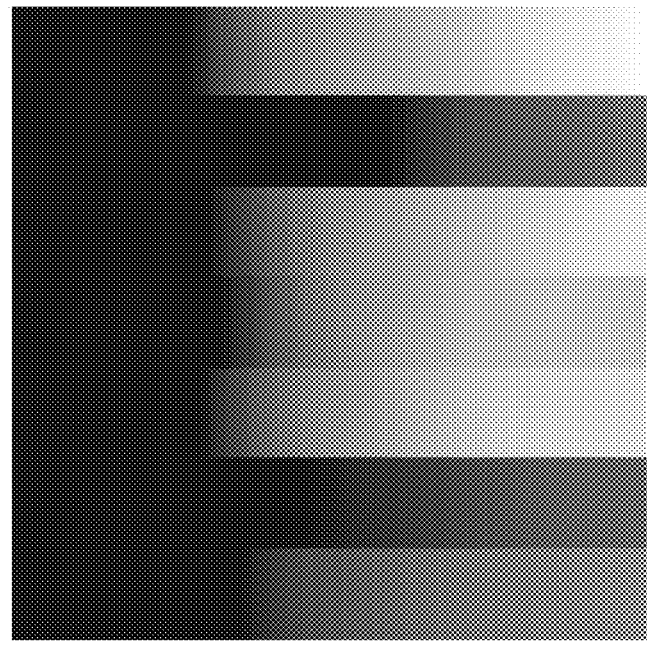
FIG. 13 represents an example showing an image before compression processing in which the gradation changes smoothly.
Figure 14:
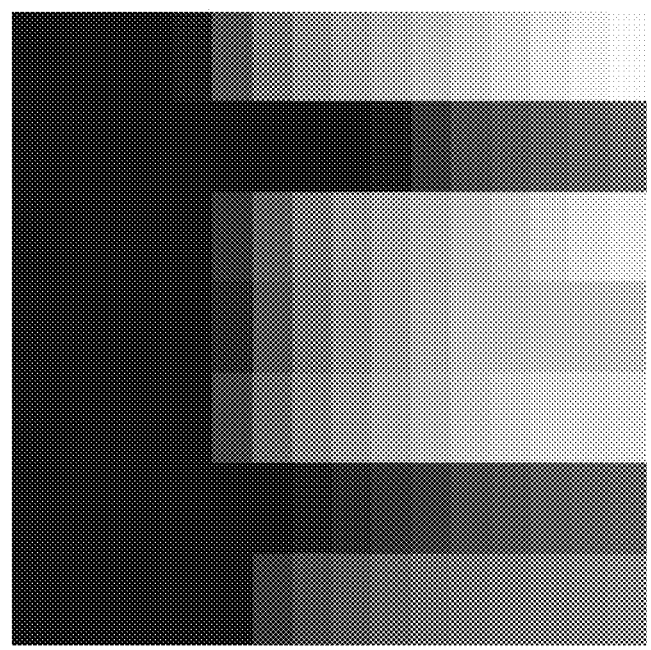
FIG. 14 represents an example showing an image after compression and decompression obtained by performing conventional quantization, in which lower bit components of image data are truncated, on the image shown in FIG. 13.
Figure 15:
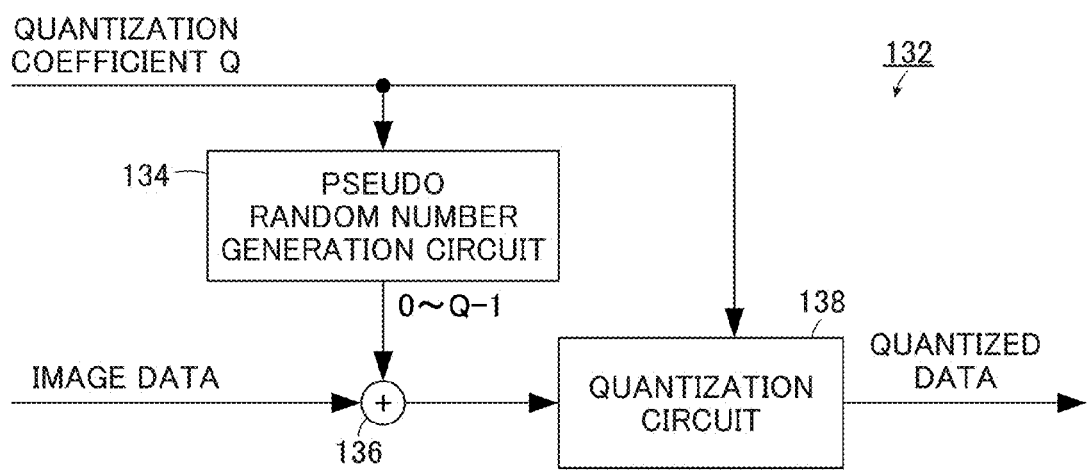
FIG. 15 is a block diagram of an example showing the configuration of a random number dithering circuit.
Figure 16A:
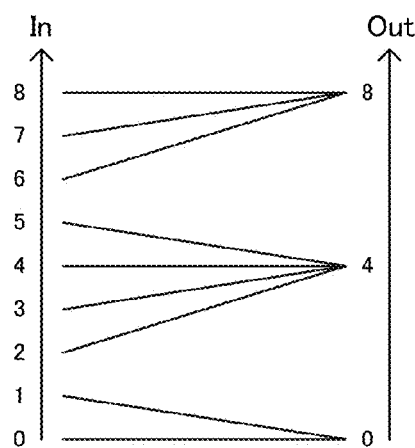
FIG. 16A is a conceptual diagram of an example showing the value of image data obtained by the conventional quantization in which lower bit components of image data are truncated.
Figure 16B:
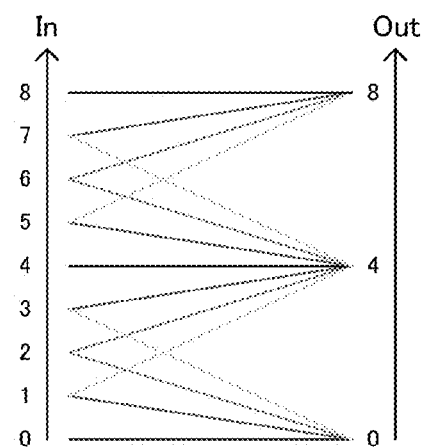
FIG. 16B is a conceptual diagram of an example showing the value of image data obtained by quantization based on conventional random number dithering.
Figure 17:
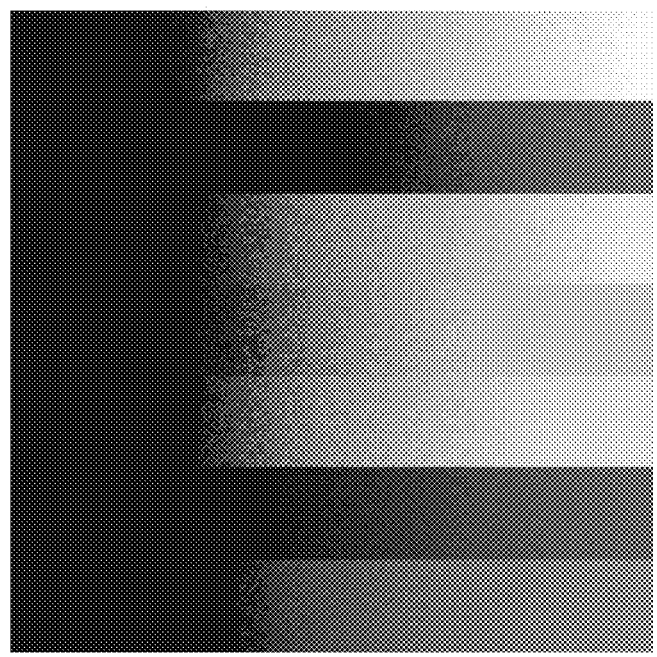
FIG. 17 illustrates an exemplary image obtained after compression and decompression by quantization based on the conventional random number dithering.

FIG. 8 represents an example showing an image obtained after compression and decompression using random number dithering of the present invention. The image shown in FIG. 8 is one obtained by applying the random number dithering of the present invention to the image shown in FIG. 13. It can be seen that a pattern due to deviation of noise appears in the image shown in FIG. 17, while in the image shown in FIG. 8, noise is constant regardless of the gradation, and the pattern appearing in the image shown in FIG. 17 is not generated.

As described above, in the image processing apparatus 10, the first and second random number seed generation circuits 14 and 22 generate the same random number seed for each line for the image compression circuit 16 and the image decompression circuit 24, and based on the random number seed, the image compression circuit 16 and the image decompression circuit 24 generate a pseudo random number for each pixel. Then, the image compression circuit 16 generates compressed data by quantizing the addition data of the image data and the pseudo random number using a quantization coefficient, and the image decompression circuit 24 subtracts the pseudo random number from the decompressed data after dequantization using the quantization coefficient. In this manner, in an image after compression and decompression, it is possible to prevent the gradation from changing stepwise or it is possible to prevent a pattern from being generated due to deviation of noise caused by a pseudo random number, and therefore, it is possible to obtain visually better display quality than that in the prior art.

The present invention is not limited to the case of displaying an image using the function of PSR or PSR2 based on the DisplayPort Standard, but can be applied to a case of quantizing and compressing image data received from a transmission side circuit and decoding and dequantizing the image data read from an image memory.

In image compression, generally, for the purpose of improving compression efficiency by reducing the correlation of image data, color space conversion from image data of the RGB color space to image data of the YUV color space or the like is performed, thereafter the image data is compressed and decompressed, and inverse color space conversion from the image data of the YUV color space or the like to the image data of the RGB color space is performed again. In the present invention, however, it is not essential to perform color space conversion and inverse color space conversion.

Although the same first random number seed may be used for the third Y image data, the third U image data, and the third V image data, it is possible to more effectively eliminate the deviation of noise due to a pseudo random number by using different first random number seeds for the third Y image data, the third U image data, and the third V image data. Similarly, the same second random number seed may also be used for the Y compressed data, the U compressed data, and the V compressed data.

In the case of displaying an image using the function of PSR2, information indicating the number of the start block of a rectangular region to be updated, among the pieces of information indicating the position of the rectangular region to be updated, may be used. In this case, in each component, processing is performed for each block with height and width.

Hereinbefore, the present invention has been described in detail, but needless to say, the present invention is not limited to the above-described embodiment, and various improvements and modifications may be made within a scope that does not depart from the gist of the present invention.

What is claimed is:

1. An image processing apparatus, comprising:
    a first random number seed generation circuit that generates a number of a line or a block of an image corresponding to first image data, based on a first image synchronization signal and generates a first random number seed by converting the number of the line or the block based on a first conversion formula for each line or block;
    an image compression circuit that generates a first pseudo random number based on the first random number seed, and generates compressed data by quantizing and encoding addition data acquired by adding up of the first image data and the first pseudo random number for each pixel corresponding to the line or the block;
    an image memory that stores the compressed data;
    a synchronization signal generation circuit that generates a second image synchronization signal;
    a second random number seed generation circuit that generates the number of the line or the block based on the second image synchronization signal and generates a second random number seed equal to the first random number seed by, converting the number of the line or the block based on a second conversion formula equal to the first conversion formula for each line or block; and an image decompression circuit that generates decompressed data by decoding and dequantizing the compressed data read from the image memory, generates a second pseudo random number equal to the first pseudo random number based on the second random number seed, and generates second image data by subtracting the second pseudo random number from the decompressed data for the each pixel.

2. The image processing apparatus according to claim 1, wherein the first random number seed generation circuit includes:
   a first number generation circuit that generates a number of a line or a block of an image corresponding to the first image data received from a transmission side circuit based on the first image synchronization signal received from the transmission side circuit for each line or block; and
   a first number conversion circuit that generates the first random number seed by converting the number of the line or the block generated by the first number generation circuit based on the first conversion formula for each line or block, and
wherein the second random number seed generation circuit includes:
   a second number generation circuit that generates a number of a line or a block of an image corresponding to the compressed data read from the image memory based on the second image synchronization signal for each line or block; and
   a second number conversion circuit that generates the second random number seed by converting the number of the line or the block generated by the second number generation circuit based on the second conversion formula for each line or block.

3. The image processing apparatus according to claim 2, wherein the first number conversion circuit converts the number of the line or the block generated by the first number generation circuit based on the first conversion formula that, varies with frame, and
wherein the second number conversion circuit converts the number of the line or the block generated by the second number generation circuit based on the second conversion formula equal to the first conversion formula for each frame.

4. The image processing apparatus according to claim 2, wherein the first random number seed generation circuit generates the first random number seed from a start line or a start block corresponding to information of a start line or a start block received from the transmission side circuit,
wherein the image compression circuit generates the compressed data from the start ne or the start block, and
wherein the image memory stores the compressed data from the start line or the start block.

5. The image processing apparatus according to claim 3, wherein the first random number seed generation circuit generates the first random number seed from a start line or a start block corresponding to information of a start line or a start block received from the transmission side circuit,
wherein the image compression circuit generates the compressed data from the start line or the start block, and
wherein the image memory stores the compressed data from the start line or the start block.

6. The image processing apparatus according to claim 2, wherein the image compression circuit includes an encoding circuit that generates the compressed data by encoding the first image data,
wherein the encoding circuit includes:
   a first pseudo random number generation circuit that generates the first pseudo random number based on the first random number seed and a quantization coefficient for the each pixel;
   a first adder that generates the addition data by adding up the first image data and the first pseudo random number for the each pixel;
   a quantization circuit that generates first quantized data by quantizing the addition data using the quantization coefficient for the each pixel; and
   an entropy encoding circuit that generates the compressed data by entropy-encoding the first quantized data for the each pixel,
wherein the image decompression circuit includes a decoding circuit that generates the decompressed data by decoding the compressed data read from the image memory, and
wherein the decoding circuit includes:
   an entropy decoding circuit that generates second quantized data by entropy-decoding the compressed data read from the image memory for the each pixel;
   a dequantization circuit that generates the decompressed data by dequantizing the second quantized data using the quantization coefficient for the each pixel;
   a second pseudo random number generation circuit that generates the second pseudo random number based on the second random number seed and the quantization coefficient for the each pixel; and
   a first subtractor that generates the second image data by subtracting the second pseudo random number from the decompressed data for the each pixel.

7. The image processing apparatus according to claim 3, wherein the image compression circuit includes an encoding circuit that generates the compressed data by encoding the first image data,
wherein the encoding circuit includes:
   a first pseudo random number generation circuit that generates the first pseudo random number based on the first random number seed and a quantization coefficient for the each pixel;
   a first adder that generates the addition data by adding up the first image data and the first pseudo random number for the each pixel;
   a quantization circuit that generates first quantized data by quantizing the addition data using the quantization coefficient for the each pixel; and
   an entropy encoding circuit that generates the compressed data by entropy-encoding the first quantized data for the each pixel,
wherein the image decompression circuit includes a decoding circuit that generates the decompressed data by decoding the compressed data read from the image memory, and wherein the decoding circuit includes:
an entropy decoding circuit that generates second quantized data by entropy-decoding the compressed data read from the image memory for the each pixel;
a dequantization circuit that generates the decompressed data by dequantizing the second quantized data using the quantization coefficient for the each pixel;
a second pseudo random number generation circuit that generates the second pseudo random number based on the second random number seed and the quantization coefficient for the each pixel; and
a first subtractor that generates the second image data by subtracting the second pseudo random number from the decompressed data for the each pixel.

8. The image processing apparatus according to claim 4,
wherein the image compression circuit includes an encoding circuit that generates the compressed data by encoding the first image data,
wherein the encoding circuit includes:
a first pseudo random number generation circuit that generates the first pseudo random number based on the first random number seed and a quantization coefficient for the each pixel;
a first adder that generates the addition data by adding up the first image data and the first pseudo random number for the each pixel;
a quantization circuit that generates first quantized data by quantizing the addition data using the quantization coefficient for the each pixel; and
an entropy encoding circuit that generates the compressed data by entropy-encoding the first quantized data for the each pixel,
wherein the image decompression circuit includes a decoding circuit that generates the decompressed data by decoding the compressed data read from the image memory, and
wherein the decoding circuit includes:
an entropy decoding circuit that generates second quantized data by entropy-decoding the compressed data read from the image memory for the each pixel;
a dequantization circuit that generates the decompressed data by dequantizing the second quantized data using the quantization coefficient for the each pixel;
a second pseudo random number generation circuit that generates the second pseudo random number based on the second random number seed and the quantization coefficient for the each pixel; and
a first subtractor that generates the second image data by subtracting the second pseudo random number from the decompressed data for the each pixel.

9. The image processing apparatus according to claim 5,
wherein the image compression circuit includes an encoding circuit that generates the compressed data by encoding the first image data,
wherein the encoding circuit includes:
a first pseudo random number generation circuit that generates the first pseudo random number based on the first random number seed and a quantization coefficient for the each pixel;
a first adder that generates the addition data by adding up the first image data and the first pseudo random number for the each pixel;
a quantization circuit that generates first quantized data by quantizing the addition data using the quantization coefficient for the each pixel; and
an entropy encoding circuit that generates the compressed data by entropy-encoding the first quantized data for the each pixel,
wherein the image decompression circuit includes a decoding circuit that generates the decompressed data by decoding the compressed data read from the image memory, and
wherein the decoding circuit includes:
an entropy decoding circuit that generates second quantized data by entropy-decoding the compressed data read from the image memory for the each pixel;
a dequantization circuit that generates the decompressed data by dequantizing the second quantized data using the quantization coefficient for the each pixel;
a second pseudo random number generation circuit that generates the second pseudo random number based on the second random number seed and the quantization coefficient for the each pixel; and
a first subtractor that generates the second image data by subtracting the second pseudo random number from the decompressed data for the each pixel.

10. The image processing apparatus according to claim 6,
wherein the encoding circuit further includes a first prediction circuit that generates first differential data by subtracting the first quantized data, which corresponds to an image temporally before a current image, from the first quantized data generated by, the quantization circuit for the each pixel,
wherein the entropy encoding circuit generates the compressed data by entropy-encoding the first differential data,
wherein the entropy decoding circuit generates second differential data by entropy-decoding the compressed data read from the image memory, and
wherein the decoding circuit further includes a second prediction circuit that generates the second quantized data by adding up the second differential data generated by the entropy decoding circuit and the second quantized data corresponding to an image temporally before a current image for the each pixel.

11. The image processing apparatus according to claim 7,
wherein the encoding circuit further includes a first prediction circuit that generates first differential data by subtracting the first quantized data, which corresponds to an image temporally before a current image, from the first quantized data generated by the quantization circuit for the each pixel,
wherein the entropy encoding circuit generates the compressed data by entropy-encoding the first differential data,
wherein the entropy decoding circuit generates second differential data by entropy-decoding the compressed data read from the image memory, and
wherein the decoding circuit further includes a second prediction circuit that generates the second quantized data by adding up the second differential data generated by the entropy decoding circuit and the second quantized data corresponding to an image temporally before a current image for the each pixel.

12. The image processing apparatus according to claim 8,
wherein the encoding circuit further includes a first prediction circuit that generates first differential data by subtracting the first quantized data, which corresponds to an image temporally before a current image, from the first quantized data generated by the quantization circuit for the each pixel, wherein the entropy encoding circuit generates the compressed data by entropy-encoding the first differential data, wherein the entropy decoding circuit generates second differential data by entropy-decoding the compressed data read from the image memory, and wherein the decoding circuit further includes a second prediction circuit that generates the second quantized data by adding up the second differential data generated by the entropy decoding circuit and the second quantized data corresponding to an image temporally before a current image for the each pixel.

13. The image processing apparatus according to claim 9, wherein the encoding circuit further includes a first prediction circuit that generates first differential data by subtracting the first quantized data, which corresponds to an image temporally before a current image, from the first quantized data generated by the quantization circuit for the each pixel, wherein the entropy encoding circuit generates the compressed data by entropy-encoding the first differential data, wherein the entropy decoding circuit generates second differential data by entropy-decoding the compressed data read from the image memory, and wherein the decoding circuit further includes a second prediction circuit that generates the second quantized data by adding up the second differential data generated by the entropy decoding circuit and the second quantized data corresponding to an image temporally before a current image for the each pixel.

14. The image processing apparatus according to claim 6, wherein the first image data is image data of an RGB color space, wherein the image compression circuit further includes:
  a color space conversion circuit that converts the first image data of the RGB color space into third Y image data, third U image data, and third V image data as third image data of a YUV color space; and
  a quantization coefficient generation circuit that generates, as the quantization coefficient, a Y quantization coefficient, a U quantization coefficient, and a V quantization coefficient corresponding to the third Y image data, the third U image data, and the third V image data, wherein the encoding circuit includes first, second, and third encoding circuits that generate, as the compressed data, Y compressed data, U compressed data, and V compressed data corresponding to the third Y image data, the third U image data, and the third V image data, wherein the image memory stores the Y compressed data, the U compressed data, and the V compressed data generated by the encoding circuit and the Y quantization coefficient, the U quantization coefficient, and the V quantization coefficient generated by the quantization coefficient generation circuit, wherein the decoding circuit includes first, second, and third decoding circuits that generate, as the second image data, second Y image data, second U image data, and second V image data corresponding to the Y compressed data, the U compressed data, and the V compressed data read from the image memory, and wherein the image decompression circuit further includes an inverse color space conversion circuit that converts the second image data of the YUV color space generated by the decoding circuit into fourth image data of the RGB color space.

15. The image processing apparatus according to claim 10, wherein the first image data is image data of an RGB color space, wherein the image compression circuit further includes:
  a color space conversion circuit that converts the first image data of the RGB color space into third Y image data, third U image data, and third V image data as third image data of a YUV color space; and
  a quantization coefficient generation circuit that generates, as the quantization coefficient, a Y quantization coefficient, a U quantization coefficient, and a V quantization coefficient corresponding to the third Y image data, the third U image data, and the third V image data, wherein the encoding circuit includes first, second, and third encoding circuits that generate, as the compressed data, Y compressed data, U compressed data, and V compressed data corresponding to the third Y image data, the third U image data, and the third V image data, wherein the image memory stores the Y compressed data, the U compressed data, and the V compressed data generated by the encoding circuit and the Y quantization coefficient, the U quantization coefficient, and the V quantization coefficient generated by the quantization coefficient generation circuit, wherein the decoding circuit includes first, second, and third decoding circuits that generate, as the second image data, second Y image data, second U image data, and second V image data corresponding to the Y compressed data, the U compressed data, and the V compressed data read from the image memory, and wherein the image decompression circuit further includes an inverse color space conversion circuit that converts the second image data of the YUV color space generated by the decoding circuit into fourth image data of the RGB color space.

16. The image processing apparatus according to claim 14, wherein the first random number seed generation circuit generates, as the first random number seed, a first Y random number seed, a first U random number seed, and a first V random number seed corresponding to the third Y image data, the third U image data, and the third V image data, wherein the quantization coefficient generation circuit generates, as the quantization coefficient, a Y quantization coefficient, a U quantization coefficient, and a V quantization coefficient corresponding to the third Y image data, the third U image data, and the third V image data, wherein the first, second, and third encoding circuits respectively generate the Y compressed data, the U compressed data, and the V compressed data by encoding the third Y image data, the third U image data, and the third V image data based on the first Y random number seed, the first U random number seed, and the first V random number seed and the Y quantization coefficient, the U quantization coefficient, and the V quantization coefficient, wherein the second random number seed generation circuit generates, as the second random number seed, a second Y random number seed, a second U random number seed, and a second V random number seed corresponding to the Y compressed data, the U compressed data, and the V compressed data read from the image memory, and wherein the first, second, and third decoding circuits respectively generate second Y image data, second U image data, and second V image data as the second image data by decoding the Y compressed data, the U compressed data, and the V compressed data read from the image memory based on the second Y random number seed, the second U random number seed, and the second V random number seed and the Y quantization coefficient, the U quantization coefficient, and the V quantization coefficient.

17. The image processing apparatus according to claim 15,
wherein the first random number seed generation circuit generates, as the first random number seed, a first Y random number seed, a first U random number seed, and a first V random number seed corresponding to the third Y image data, the third U image data, and the third V image data,
wherein the quantization coefficient generation circuit generates, as the quantization coefficient, a Y quantization coefficient, a U quantization coefficient, and a V quantization coefficient corresponding to the third Y image data, the third U image data, and the third V image data,
wherein the first, second, and third encoding circuits respectively generate the Y compressed data, the U compressed data, and the V compressed data by encoding the third Y image data, the third U image data, and the third V image data based on the first Y random number seed, the first U random number seed, and the first V random number seed and the Y quantization coefficient, the U quantization coefficient, and the V quantization coefficient,
wherein the second random number seed generation circuit generates, as the second random number seed, a second Y random number seed, a second U random number seed, and a second V random number seed corresponding to the Y compressed data, the U compressed data, and the V compressed data read from the image memory, and
wherein the first, second, and third decoding circuits respectively generate second Y image data, second U image data, and second V image data as the second image data by decoding the Y compressed data, the U compressed data, and the V compressed data read from the image memory based on the second Y random number seed, the second U random number seed, and the second V random number seed and the Y quantization coefficient, the U quantization coefficient, and the V quantization coefficient.

* * * * *